United States Patent
Ishikawa et al.

(10) Patent No.: US 6,788,874 B1
(45) Date of Patent: Sep. 7, 2004

(54) OPTICAL COMPONENT

(75) Inventors: Shinji Ishikawa, Yokohama (JP); Masakazu Shigehara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/570,392

(22) Filed: May 12, 2000

(30) Foreign Application Priority Data

May 13, 1999 (JP) .......................................... 11-133025

(51) Int. Cl.$^7$ ................................................ G02B 6/00
(52) U.S. Cl. ...................................... 385/141; 385/122
(58) Field of Search .......................... 385/122, 141–145

(56) References Cited

U.S. PATENT DOCUMENTS 5,739,948 A * 4/1998 Kushibiki et al. .......... 359/321

OTHER PUBLICATIONS

OFC®' 95 Optical Fiber Communications, Summaries of Papers Presented At The Conference On Optical Fiber Communication, Feb. 26–Mar. 3, 1995, pp. 134–135.
ECOC '96, 22nd European Conference on Optical Communications, Sep. 15–19, 1996, Olso, Norway, pp. 1.62–1.64.
IOOC–ECOC97, 11th International Conference on Integrated Optics and Optical Fibre Communicatioins, 23rd European Conference on Optical Communications, vol. 5—POST Deadline Papers, Sep. 22–25, 1997, pp. 32–37.
"Technique For Making LightWave Circuit Temperature-–Independent", Yasuo Kokubun, Yokohama National University, Faculty of Engineering Division of Electrical and Computer Engineering, pp. 933–938 (with English Translation).

"Design of silica athermal waveguide", Shigeru Yoneda et al., Yokohama Nat'l Univ., Faculty of Eng., Kanagawa Academy of Science and aTechnology, Mar. 24–27, 1997, pp. 187, 217 and 223 (with English Translation).

"Low–loss Athermal Silica–based Arrayed–waveguide Grating Multiplexer", A. Kaneko et al., Mar. 25–28, 1999, pp. 403–404 (with English Translation).

* cited by examiner

Primary Examiner—Akm Enayet Ullah
Assistant Examiner—Jerry T Rahll
(74) Attorney, Agent, or Firm—McDermott, Will & Emery

(57) ABSTRACT

An optical component is an optical fiber grating element having a grating formed in the core region of an optical fiber, and a cladding region is made of silica glass. An optical material for the core region is ladder-type silicone resin, whose refractive index is set to a desired value by appropriately adjusting the mixing ratio between SiO and a functional group and the mixing ratio of a phenyl group to a methyl group. The optical component has a desired thermal expansion coefficient and desired temperature characteristics as a whole.

3 Claims, 6 Drawing Sheets

OPTICAL COMPONENT

BACKGROUND OF THE INVENTION

1. Field of the invention

The present invention relates to an optical component using an optical material which can be adjusted to have desired characteristics.

2. Related Background Art

An optical component made up of an optical waveguide and the like undergoes a change in optical path length with a change in temperature T, resulting in a change in characteristics. The rate of change in optical path length is the sum of a temperature dependence $dn_{eq}/dT$ of an effective refractive index $n_{eq}$ and a thermal expansion coefficient $\alpha_{sub}$. It is generally preferable that an optical component keep its characteristics constant at any temperature within an operating temperature range. In order to eliminate such a temperature dependence, a plurality of materials whose refractive index temperature coefficients and thermal expansion coefficients differ in sign must be selected and an optical component must be formed by using the selected materials such that the optical component satisfies the athermal condition represented by the following equation within an operating temperature range as a whole (e.g., Yasuo Kokubun, "Temperature-independent lightwave devices", OYO BUTURI, Vol. 66, No. 9, pp. 933–938 (1997)).

$$\frac{1}{n_{eq}}\frac{dn_{eq}}{dT} + \alpha_{sub} = 0 \quad (1)$$

For example, as a temperature dependence eliminating (temperature compensation) technique for an optical fiber grating element serving as an optical component having a Bragg grating formed in the core region of an optical fiber, a technique of mounting an optical fiber grating element on a member having a negative thermal expansion coefficient (e.g., silica glass, liquid crystal polymer, bimetal, glass, metal, or the like) is known (e.g., G. W. Yoffe, et al., "Temperature-compensated optical-fiber Bragg gratings", OFC '95 Technical Digest, WI4 (1995)). According to this technique, this mount member gives the optical fiber grating element a negative thermal expansion ($-1 \times 10^{-5}/°$ C.) to cancel out the positive refractive index temperature dependence ($1 \times 10^{-5}/°$ C.) of silica glass as the main constituent of the optical fiber, thereby satisfying the athermal condition represented by equation (1).

An organic material often has a negative refractive index temperature coefficient and a large positive thermal expansion coefficient. In terms of the principle of temperature dependence elimination, this material can be regarded as a material that exhibits a great decrease in refractive index due to a density decrease caused by thermal expansion as compared with an increase in refractive index due to electronic polarization caused by a temperature rise. On the other hand, an inorganic material such as silica glass has a positive refractive index temperature coefficient. Studies have therefore been made on a technique of satisfying the athermal condition represented by equation (1) by forming an optical component using a combination of an organic material and inorganic material (silica glass).

For example, an optical waveguide which is one type of optical component, in which a core region is made of an inorganic material ($SiO_2$—$GeO_2$), a cladding region is partly made of an inorganic material ($SiO_2$), and the remaining part is made of organic materials (PMMA and TFMA) (e.g., shigeru Yoneda, et al., "Design of silica-based athermal optical waveguide", PROCEEDINGS OF THE 1997 IEICE GENERAL CONFERENCE, C-3-2, p. 187 (1997))is known. According to this technique, the overall temperature dependence of the optical component is eliminated by using the difference in the temperature dependence of refractive index between light in the core region and light entering the cladding region.

Likewise, an AWG (Arrayed Waveguide Grating) which is a kind of optical component and, in which most of the optical path of the arrayed waveguide grating in the longitudinal direction is made of an inorganic material (silica-based material), and part of the optical path is made of an organic material (silicone resin) (e.g., Y. Inoue, et al., "Athermal silica-based arrayed-waveguide grating (AWG) multiplexer", IOOC-ECOC97, pp. 33–36 (1997)) is known. This technique is designed to eliminate the overall temperature dependence of the optical component by making the temperature dependences of the inorganic material and organic material on the optical path cancel out each other.

The following problems arise in the above mentioned temperature dependence eliminating technique. When an optical component is mounted on a member having a thermal expansion coefficient different in sign from that of the optical component, the mounting step is required in addition to the steps of fabricating the optical component. The arrangement including this member is not simple. When part of the cladding region of an optical component is made of an inorganic material and the remaining part is made of an organic material, it is difficult to make the overall cladding region uniform in material properties, and hence the optical component is likely to have polarization characteristics. In addition, When part of an optical path extending in an optical component in the light propagating direction is replaced with an organic material, a great optical loss is caused by, for example, reflection at the interface between the inorganic material and the organic material.

The above description is associated with the temperature dependence of an optical component whose temperature dependence is preferably eliminated or reduced. Some optical components used as active devices having the function of controlling characteristics by temperature adjustment preferably have high temperature dependence. In this case as well, an arrangement similar to that described above is conceivable, which suffers problems similar to those described above.

SUMMARY OF THE INVENTION

The present invention has been made to solve the above mentioned problems. Objects of this invention are to provide an optical component which has a low optical loss, has a simple arrangement, can be easily manufactured, and has desired temperature characteristics.

An optical component according to the present invention is characterized in that an optical material obtained by chemically bonding an inorganic material containing $SiO_2$ as a main constituent and an organic material or by mixing a particulate inorganic material and an organic material is used for an optical waveguide region. The organic material is preferably silicone resin. The optical material obtained by chemically bonding the inorganic material and the organic material is preferably ladder-type silicone resin. In accordance with the mixing ratio between the inorganic material and the organic material, the optical material has a desired temperature dependence of refractive index. In addition, in accordance with a combination of the above optical material and another material, the optical component according to the present invention has a desired thermal expansion coefficient and desired temperature characteristics as a whole. Therefore, this optical component need not use another member for mounting. This facilitates the manufacturing process and allows a simple arrangement. In addition, in the optical component, the optical material can be made uniform in material properties along the optical path of the optical waveguide, thereby attaining a reduction in optical loss.

DESCRIPTION OF THE PREFERRED EMBODIMENTS

Figure 1:
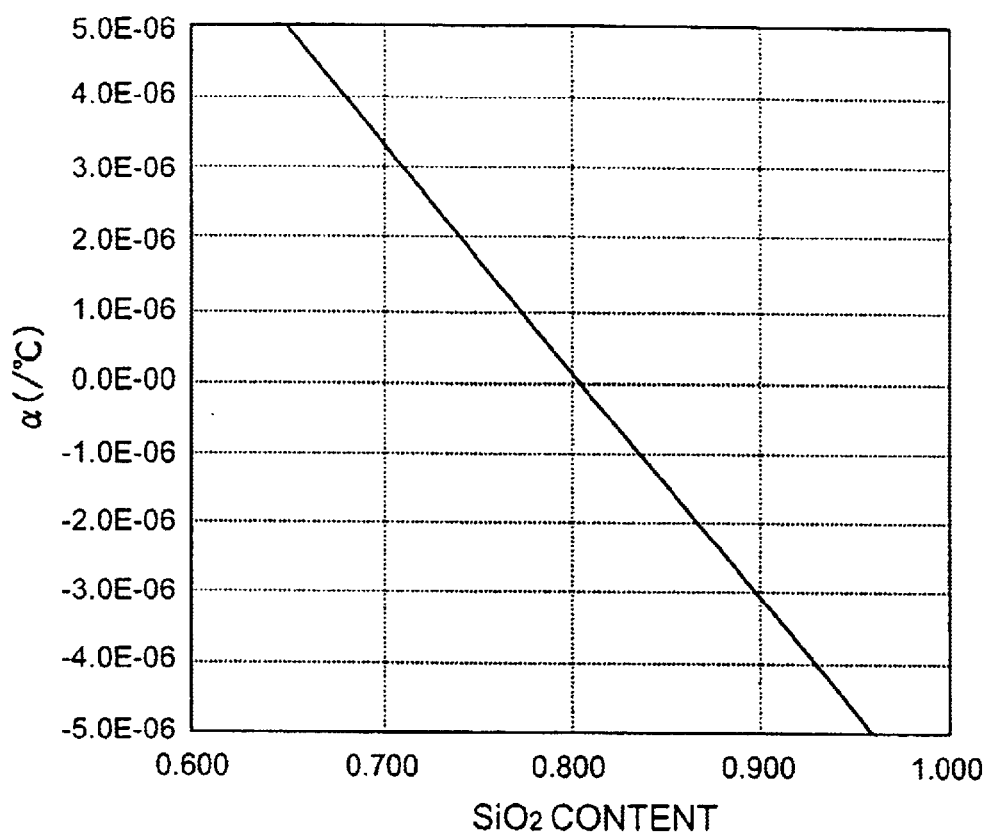
FIG. 1 is a graph showing a thermal expansion coefficient α of a substrate which can cancel out the refractive index temperature coefficient of an optical material according to the first embodiment to the $SiO_2$ content in the optical material.

Embodiments of the present invention will be described in detail hereinbelow with reference to the accompanying drawings. The same reference numerals denote the same parts throughout the drawings, and a repetitive description will be avoided. Two embodiments of an optical material preferably used for an optical waveguide region of an optical component according to the present invention will be described first, and two embodiments of the optical component according to the present invention wilt be described next.

(First Embodiment of Optical Material)

The first embodiment of an optical material prefereably used for an optical component according to the present invention will be described first. The optical material according to this embodiment is a compound of a particulate inorganic material mainly consisting of $SiO_2$ and an organic material, and has a predetermined temperature dependence of refractive index in accordance with the mixing ratio between the inorganic material and the organic material. As the organic material, silicone resin is preferabley used.

The inorganic material in this embodiment is fine particles that mainly consist of $SiO_2$ and have a uniform particle size. The smaller the particle size of the fine particles of this inorganic material is, the better the optical component is This particle size is preferably less than 50 nm, and more preferably less than 10 nm. $SiO_2$ having a particle size of several nm is actually available. The optical material according to this embodiment is obtained by mixing such an inorganic material into an organic material such as silicone resin. Light that passes through such an optical material exhibits scattering characteristics similar to Rayleigh scattering owing to the fine particles of the inorganic material. If, however, the particle size of the inorganic material is sufficiently small, and the optical path length of the optical material through which light passes is sufficiently short, the scattering loss of light in this optical material falls within an allowable range.

The refractive index temperature coefficient of $SiO_2$ is about $1 \times 10^{-5}/°$ C. The refractive index temperature coefficient of silicone resin is about $-37 \times 10^{-5}/°$ C. An optical material having a desired temperature dependence of refractive index can be realized by mixing $SiO_2$ and silicone resin at an appropriate mixing ratio. For example, in order to realize an optical material having a very low refractive index temperature coefficient, $SiO_2$ and silicone resin need to be 97% and 3%, respectively. In practice, however, it is almost impossible to fill the spaces among many homogeneous spherical $SiO_2$ fine particles with a small amount of silicone resin. Note that no consideration has been given to thermal expansion coefficient so far.

In order to consider thermal expansion coefficient as well as refractive index temperature coefficient, assume that an optical material according to this embodiment exists on a substrate. FIG. 1 is a graph showing a thermal expansion coefficient a of the substrate which can cancel out the refractive index temperature coefficient of the optical material according to the first embodiment with respect to the $SiO_2$ content in this optical material. In this case, the athermal condition indicated by the aforementioned equation (1) is used. According to this graph, assuming that the value of the temperature coefficient α of the substrate is a positive value, the optical material according to this embodiment must contain 73% of $SiO_2$ and 27% of silicone resin in order to cancel out $2.5 \times 10^{-6}/°$ C., the thermal expansion coefficient of the silicon substrate. If, for example, a pyrex substrate having a larger thermal expansion coefficient $\alpha(\alpha = 3.2 \times 10^{-6}/°$ C.) is used, the mixing ratio between the inorganic material and organic material of the optical material according to this embodiment becomes a more feasible value, Note that when the optical material according to this embodiment exists on a substrate, a stress/strain refractive index may be produced in the optical material according to this embodiment due to the thermal expansion difference between the optical material and the substrate. However, the Young's modulus of the organic material is lower than that of glass. Accordingly, the Young's modulus of the optical material according to this embodiment is low, and hence the stress/strain refractive index is low.

(Second Embodiment of Optical Material)

The second embodiment of the optical material preferably used for the optical component according to the present invention will be described next. The optical material according to this embodiment is obtained by chemically bonding an inorganic material mainly consisting of $SiO_2$ to an organic material, and has a predetermined temperature dependence of refractive index in accordance with the mixing ratio between the inorganic material and the organic material. As the organic material, silicone resin is preferably used. This optical material, in particular, preferably contains a ladder-type silicone resin.

A ladder-type silicone resin is obtained by bonding an SiO matrix as an inorganic material to a functional group as an organic material, In this case, the functional group is a methyl ($CH_3$) group, phenyl ($C_6H_5$) group, or the like. By bonding SiO and a functional group to each other at an appropriate mixing ratio, an optical material (ladder-type silicone resin) having a desired temperature dependence of refractive index can be realized. The SiO content can be adjusted within the range from about 45% to 80%.

Figure 2:
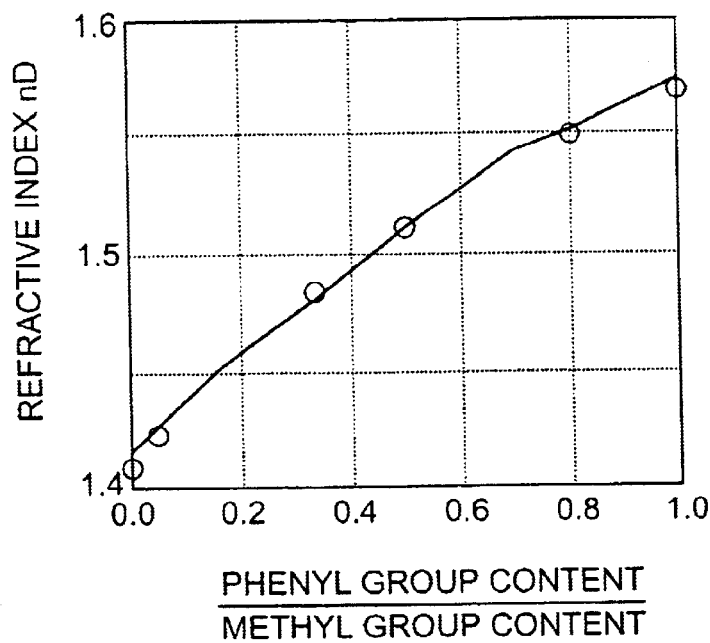
FIG. 2 is a graph showing the refractive index of an optical material according to the second embodiment to the ratio of a phenyl group content to a methyl group content.

The refractive index of the optical material (ladder-type silicone resin) can be adjusted in accordance with the type of functional group and mixing ratio. FIG. 2 is a graph showing the refractive index of the optical material according to the second embodiment as a function of the mixing ratio of a phenyl group to a methyl group. According to this graph, the refractive index of the optical material according to this embodiment almost linearly changes with respect to the mixing ratio of the phenyl group to the methyl group. The optical material according to this embodiment is also preferable in terms of refractive index distribution control.

When the optical material (ladder-type silicone resin) according to this embodiment exists on a silicon substrate, the athermal condition can be satisfied by setting the content of the organic material to about 80% If, for example, a Pyrex Glass(Trademark) substrate having a larger thermal expansion coefficient is used, the optical material according to this embodiment can satisfy the athermal condition by adjusting the SiO content.

The temperature coefficient of the optical material (ladder-type silicone resin) according to this embodiment is $13 \times 10^{-5}/°C$., which is as large as about 250 times the temperature coefficient ($5 \times 10^{-7}/°C$.) of silica glass that can be used as a substrate. It is important to eliminate the stress/strain refractive index due to the thermal expansion difference between the optical material and the substrate as well as to satisfy the athermal condition. For the optical material according to this embodiment, any type of coating base material can be used. Therefore, the overall temperature coefficient of the optical component made up of the optical material according to this embodiment and the substrate can be easily adjusted to a desired value. In addition, as will be described later, a method of symmetrically disposing substrates can also be used.

When an optical component such as an optical waveguide is to be fabricated by forming a layer made of the optical material (ladder-type silicone resin) according to this embodiment on a substrate, a reactive ion etching process is required Silicone resin (Tq=200° C.) can be processed by oxygen plasma etching, and the optical material according to this embodiment can also be processed. In addition, an optical material is required to have a small scattering loss. When a polymer cladding fiber (silica glass core) having a cladding of the optical material according to this embodiment was manufactured on a trial basis, the scattering loss at a wavelength of 0.85 μm was 8 dB/km. The light scattering loss of this optical material is within the allowable degree.

In the wavelength range from 1.3 μm to 1.6 μm, including the wavelength band of signal light which is generally used for optical communication, an absorption loss of light is caused by the functional group contained in the optical material according to this embodiment. Even if, for example, the optical path length is as short as several cm, this absorption loss may not be neglected. However, the absorption loss associated with C—H bonds can be reduced by deuteration or fluorination of the H parts of the C—H bonds of the ladder-type silicone resin.

(First Embodiment of Optical Component)

Figure 3:
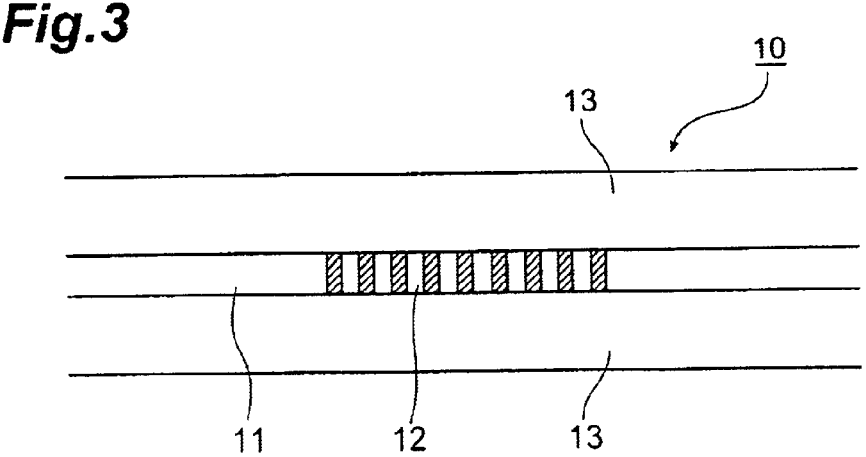
FIG. 3 is a sectional view for explaining the arrangement of an optical component (optical fiber grating element) according to the first embodiment.

The first embodiment of the optical component according to the present invention will be described next. FIG. 3 is a sectional view for explaining the constitution of an optical component (optical fiber grating element) according to the first embodiment. FIG. 3 is a sectional view taken along a plane including an optical axis. An optical component 10 according to this embodiment is an optical fiber grating element having a grating 12 formed in a core region 11 of the optical fiber. The core region 11 as an optical waveguide region is made of an optical material (ladder-type silicone resin) which is described in the second embodiment of optical material. A cladding region 13 on the core region 11 is made of silica glass.

Figure 4:
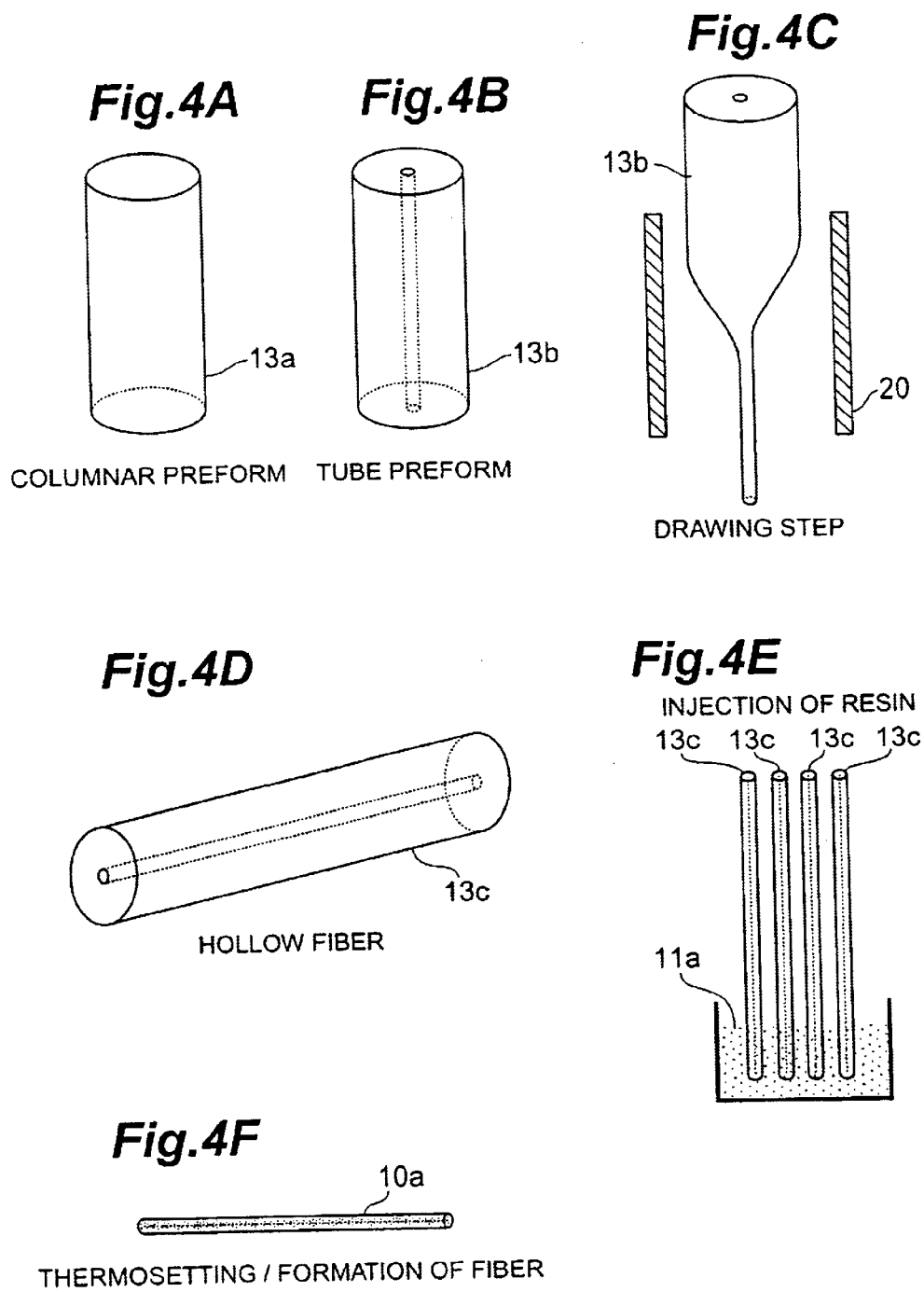
FIGS. 4A to 4F are views for explaining the steps in a method of fabricating the optical component (optical fiber grating element) according to the first embodiment.
Figure 5:
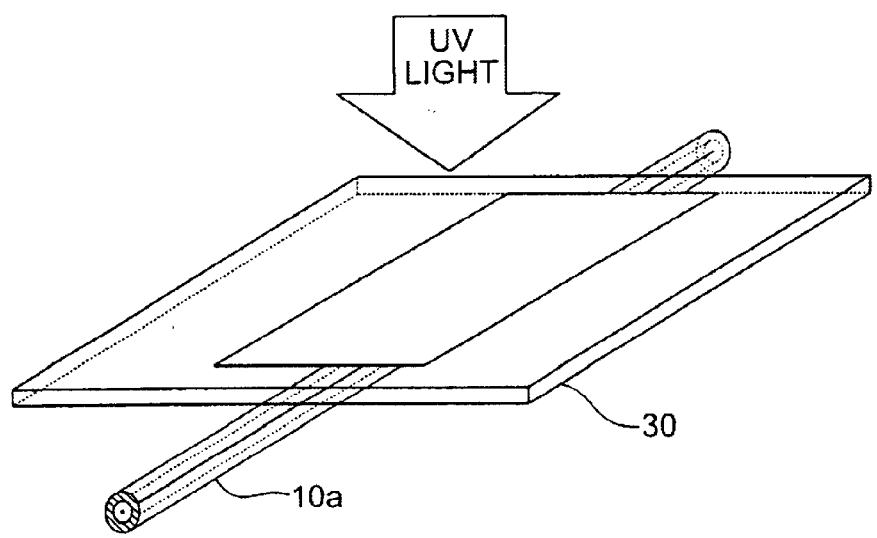
FIG. 5 is a view for explaining the method of fabricating the optical component (optical fiber grating element) according to the first embodiment.

This optical component 10 is fabricated as follows. FIGS. 4A to 4F and 5 are views for explaining a method of fabricating an optical component (optical fiber grating element) according to the first embodiment. First of all, a rod preform 13a made of silica glass is prepared (FIG. 4A). A hole having a predetermined diameter is formed in the rod preform 13a along its central axis to obtain a hollow preform 13b (FIG. 4B). The tube preform 13b is drawn while being heated (FIG. 4C) to form a hollow fiber 13c (FIG. 4D). The hollow fiber 13c is to serve as the cladding region 13 of the optical component 10, and takes the form of a capillary having an outer diameter of 125 μm and a hole diameter of 6 μm.

The hole of this capillary hollow fiber 13c is filled with an optical material 11a by capillarity (FIG. 4E). This optical material 11a is the optical material (ladder-type silicone resin) according to the second embodiment, in which the mixing ratio between SiO and a functional group is appropriately adjusted, and the mixing ratio of a phenyl group to a methyl group is also appropriately adjusted, thereby attaining a desired refractiveindex. An optical fiber 10a is fabricated by thermosetting the optical material 11a injected into the hole of the hollow fiber 13c (FIG. 4F). In this thermosetting process, the optical material 11a is heated at, for example, 200° C. for two hrs to be cured.

In the optical fiber 10a fabricated in the above manner, the region made of silica glass servers as the cladding region 13, and the cured optical material 11a serves as the core region 11. The optical fiber 10a is irradiated (FIG. 5) with ultraviolet light (UV light) through a phase grating mask 30. This ultraviolet irradiation dissociates the phenyl group in the optical material 11a to induce refractive index modulation, thereby forming the grating 12. In the above manner, the optical component 10 according to this embodiment shown in FIG. 3 is fabricated.

According to the optical component 10 actually fabricated by the above fabrication method, in the optical material 11a of the core region 11, the SiO content was 78%, and the mixing ratio of a phenyl group to a methyl group was appropriately adjusted to obtain a refractive index of 1.47. The diameter of the core region 11 (the inner diameter of the cladding region 13) was 6 μm, and the specific refractive index difference between the cladding region 13 and the core region 11 was 0.77% when it was measured by the RNF method. In addition, the refractive index modulation period of the formed grating 12 was 0.520 μm, and the grating length was 5 mm. This optical component 10 was a Bragg optical fiber grating element. The reflection central wavelength based on the optical component 10 was 1.545 μm, and the amount of light shielded at this reflection central wavelength was 40 dB. That is, the optical component 10 has sufficient characteristics for practical use.

This optical component 10 was heat-treated at 120° C. for 12 hrs to be thermally stabilized. Thereafter, the temperature dependence of light-shielding characteristics was evaluated. As a result, a change in reflection central wavelength in the temperature range from −20° C. to +80° C. was about 0.01 nm. in a conventional optical fiber grating obtained by forming a grating on a silica glass fiber having a $GeO_2$-doped core region, a change in reflection central wavelength in the above temperature range is about 1 nm. That is, the change in reflection central wavelength in the optical component 10 according to this embodiment was greatly reduced to about 1/100 that in the conventional optical component.

The optical component 10 according to this embodiment was symmetrical about the optical axis, and hence had almost no polarization dependence due to stress. Therefore, the optical component 10 had a polarization dependence of less than 0.02 dB at the reflection central wavelength, exhibiting good characteristics. In addition, in the optical component 10 according to this embodiment, the optical loss at wavelengths other than the reflection wavelength was less than 0.1 dB/cm, and the optical loss including the connection loss caused then the component is connected to a connector was less than 0.3 dB/cm. Furthermore, the optical component 10 according to this embodiment need not be mounted on another member for the purpose of eliminating temperature dependence, no mounting step is required. This facilitates the manufacturing process and allows a simple arrangement (Second Embodiment of Optical Component)

Figure 6:
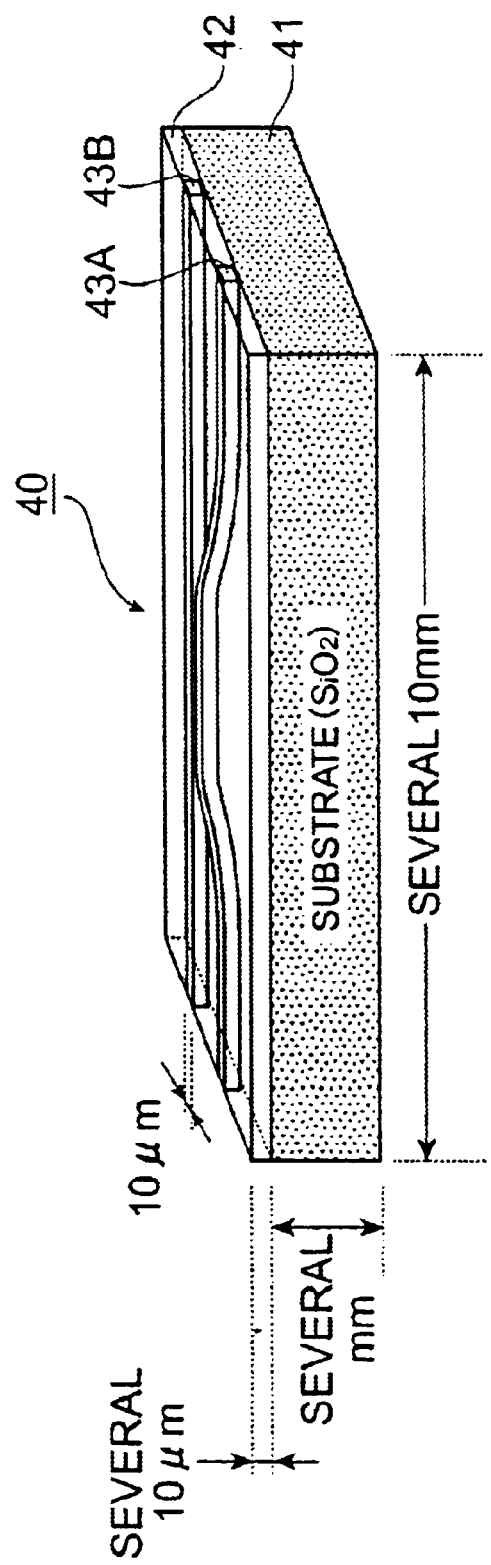
FIG. 6 is a perspective view for explaining the construction of an optical component (optical multiplexing/demultiplexing circuit) according to the second embodiment.

The second embodiment of the optical component according to the present invention will be described next. FIG. 6 is a perspective view for explaining the construction of an optical component (optical multiplexing/demultiplexing circuit) according to the second embodiment. In an optical component 40 according to this embodiment, a cladding region 42 is formed on a substrate 41, and core regions 43A and 43B serving as optical waveguide regions are formed in the cladding region 42. The core regions 43A and 43B are partly placed so near each other that coupling guided light, i.e., optical nultiplexing/demultiplexing is preformed. The substrate 41 is made of silica glass. Each of the cladding region 42 and core regions 43A and 43B is made of an optical material (ladder-type silicone resin) which is described in the second embodiment of optical material. In each of these regions, the mixing ratio between SiO and a functional group is appropriately adjusted, and the mixing ratio of a phenyl group to a methyl group is also appropriately adjusted to set the refractive index to a desired value. Note that FIG. 6 also shows typical dimensions of the optical component.

Figure 7:
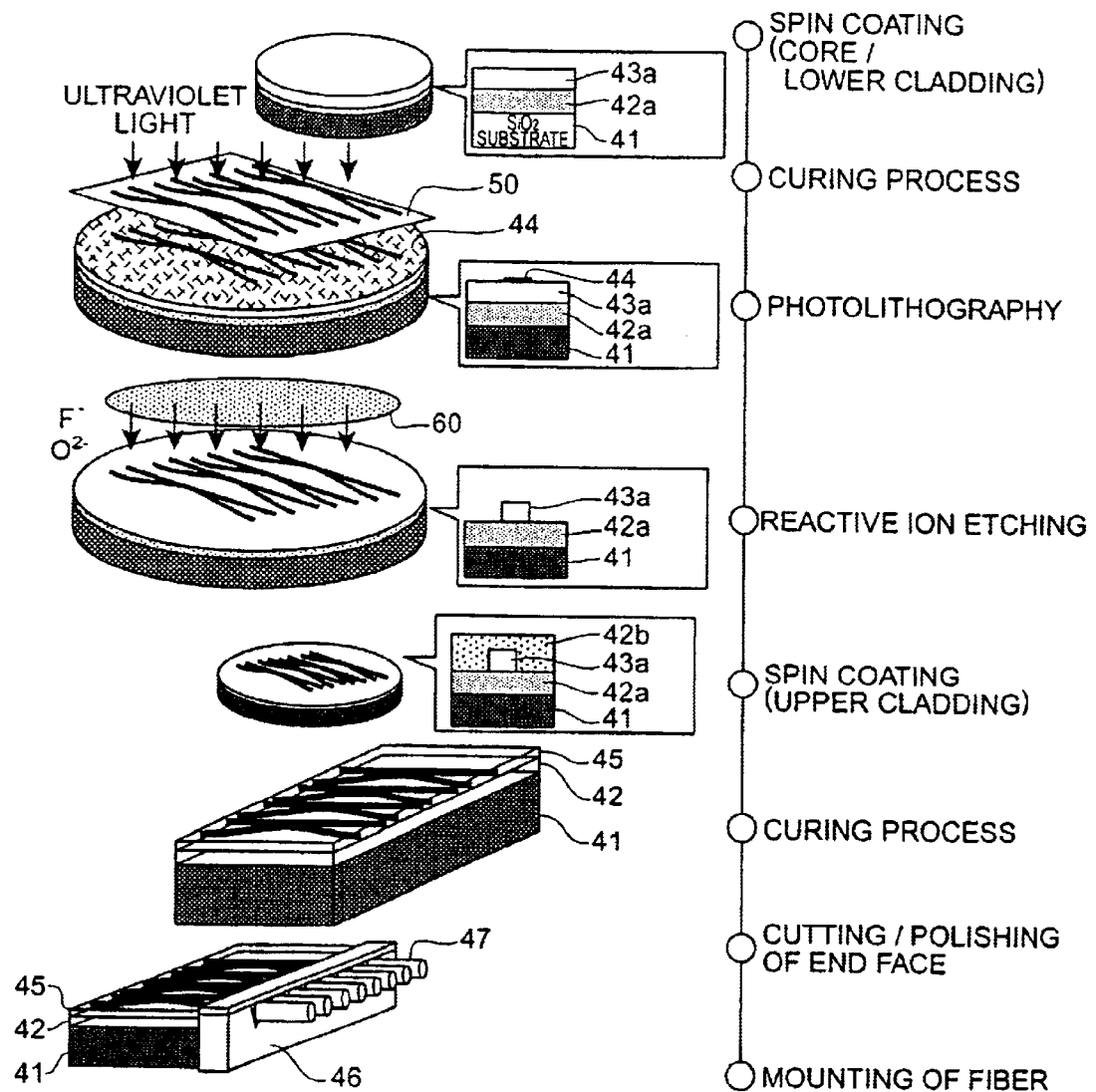
FIG. 7 is a view for explaining a method of fabricating the optical component (optical multiplexing/demultiplexing circuit) according to the second embodiment.

This optical component 40 is fabricated as follows. FIG. 7 is a view for explaining a method of fabricating the optical component (optical multiplexing/demultiplexing circuit) according to the second embodiment. First of all, the substrate 41 made of silica glass is prepared. An optical material 42a serving as the lower cladding region 42 and an optical material 43a serving as the core region 43A or 43B are sequentially formed on the substrate 41 by spin coating. Each of these optical materials 42a and 43a is the optical material (ladder-type silicone resin) according to the second embodiment, whose refractive index is set to a desired value by appropriately adjusting the mixing ratio between SiO and a functional group and the mixing ratio of a phenyl group to methyl group. The resultant structure is heat-treated at 200° C. for 2 hrs to thermoset the optical materials 42a and 43a.

Subsequently, a photoresist film 44 is formed on the optical material 43a, and a pattern of an optical multiplexing/demultiplexing circuit is formed on the photoresist film 44 by photolithography using a mask 50. A plasma 60 is generated by using a gas mixture of oxygen and $C_2F_6$ to perform reactive ion etching, thereby forming the pattern of the optical multiplexing/demultiplexing circuit on the optical material 43a. Thereafter, the photoresist film 44 is removed. An optical material 42b having the same composition as that of the optical material 42a is formed by spin coating, and the resultant structure is heated at, for example, 200° C. for 2 hrs to thermoset the optical material 42b. This optical material 42b will serve as the cladding region 42, together with the optical material 42a. A silica glass plate 45 is bonded onto the cladding 42 (optical material 42b) to reduce stress/strain in a direction perpendicular to the surface of the substrate 41. An end face of the resultant structure is then cut and polished to obtain the optical component (optical multiplexing/demultiplexing circuit) 40 according to this embodiment. In addition, the optical input/output terminals of the optical component 40 according to this embodiment are fixed to the optical input/output terminals of optical fibers 47 fixed in the V-groove portions of a V-grooved member 46 with an optical adhesive.

According to the optical component 40 actually fabricated by the above fabrication method, in each of the optical materials 42a, 42b, and 43a, the mixing ratio between SiO and a functional group was appropriately adjusted in accordance with the thermal expansion coefficient of the $SiO_2$ substrate 41, and the mixing ratio of a phenyl group to a methyl group was appropriately adjusted. As a result, the optical material 43a for the core regions 43A and 43B had a refractive index of 1.460 and a thickness of 7 μm. Each of the optical materials 42a and 43b for the cladding region 42 had a refractive index of 1.450 and a thickness of 20 μm.

In this optical component 40, the light wavelength interval in which optical multiplexing/demultiplexing occurs between the core regions 43A and 43B was 20 nm, which was relatively small. When the temperature dependence of optical multiplexing/demultiplexing characteristics of the optical component 40 was evaluated, a change in multiplexing/demultiplexing central wavelength in the temperature range from −20° C. to +80° C. was about 0.02 nm, which was very small as compared with 1.1 nm in a conventional optical waveguide using an $SiO_2$—$GeO_2$ cores In addition, in the optical component 40 according to this embodiment, the optical loss was less than 0.1 dB/cm, which posed no practical problem. Furthermore, in the optical component 40 according to this embodiment, there is no need to compound another material for the purpose of eliminating temperature dependence, no mounting step is required. This facilitates the manufacturing process and allows a simple arrangement.

The present invention is not limited to the above mentioned embodiments and can be variously modified. For example, each of the optical components according to the first and second embodiments uses the optical material according to the second embodiment (obtained by chemically coupling the inorganic material mainly consisting of $SiO_2$ and the organic material). However, each optical component may use the optical material according to the first embodiment (obtained by mixing the particulate inorganic material mainly consisting of $SiO_2$ and the organic material). The organic material is not limited to silicone resin, and another material may be used.

The optical component according to the present invention is not limited to the optical fiber grating element and optical multiplexing/demultiplexing circuit described in the above mentioned embodiments, and may be another arbitrary optical component (e.g., an AWG or optical branching circuit). In addition, each of the optical components according to the first and second embodiments is designed to eliminate temperature dependence. However, for an optical component (e.g., a variable-attenuation-amount optical attenuator) used as an active device having the function of controlling characteristics by temperature adjustment, an optical material that increases the temperature dependence of characteristics of the optical component or set it to a desired value is preferably used. In this case as well, an optical material obtained by chemically coupling an inorganic material mainly consisting of $SiO_2$ and an organic material at an appropriate mixing ratio or by mixing a particulate inorganic material and an organic material is used for the optical waveguide region of the optical component.

As has been described in detail above, in the optical component according to the present invention, the optical material obtained by chemically bonding An inorganic material mainly consisting of $SiO_2$ and an organic material or by mixing a particulate inorganic material and an organic material is used for the optical waveguide region. In accordance with the mixing ratio between the inorganic material and the organic material, the optical material has a desired temperature dependence of refractive index. In addition, in accordance with a combination of the above optical material and another material, the optical component according to the present invention has a desired thermal expansion coefficient and desired temperature characteristics as a whole. Therefore, this optical component need not be mounted on another member for the purpose of eliminating temperature dependence, no mounting step is required. This facilitates the manufacturing process and allows a simple arrangement. In addition, in the optical component, the optical material can be made uniform in material properties along the optical path of the optical waveguide, thereby attaining a reduction in optical loss.

What is claimed is:

1. An optical component having an optical waveguide region, the optical waveguide region comprising an optical material which is obtained by mixing a particulate inorganic material containing $SiO_2$, having a particle size less than 50 nm, and an organic material.

2. A component according to claim 1, wherein the organic material is silicone resin.

3. An optical component having an optical waveguide region, the optical waveguide region comprising an optical material obtained by chemically bonding an inorganic material containing $SiO_2$ as a main constituent and an organic material, or by mixing a particulate inorganic material and an organic material, wherein the optical material is obtained by chemically bonding the inorganic material and the organic material is a ladder-type silicone resin.

* * * * *